Figure 1:
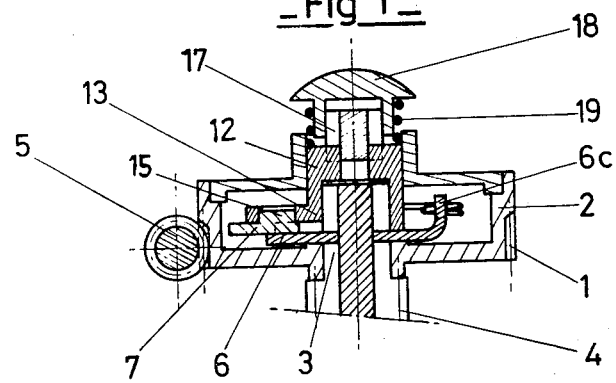

United States Patent [19]
Habert

[11] 3,821,907
[45] July 2, 1974

[54] MEANS FOR OPERATING THE SIDE-WINDOWS IN AUTOMOBILE VEHICLES

[76] Inventor: Roger Habert, 73, Avenue de la Republique, 93800 Epinay/Seine, Paris, France

[22] Filed: May 31, 1973

[21] Appl. No.: 365,716

[30] Foreign Application Priority Data
June 9, 1972 France .............................. 72.20860
Apr. 18, 1973 France .............................. 73.14203

[52] U.S. Cl. ................................................. 74/425
[51] Int. Cl. ............................................. F16h 1/16
[58] Field of Search ...................................... 74/425

[56] References Cited
UNITED STATES PATENTS
3,319,482 5/1967 Campbell et al. ..................... 74/425
3,742,781 7/1973 Boyriven .............................. 74/625

*Primary Examiner*—Leonard H. Gerin
*Attorney, Agent, or Firm*—George F. Dvorak

[57] ABSTRACT

A worm and worm wheel reduction mechanism for use in vehicle window operating mechanism wherein said mechanism includes a housing rotatable with the worm wheel, a shaft for connection to window moving means, a guide member rotatable with said shaft, an anchoring member rotatable with said guide member and radially slidable therein between a coupled position in which it enters a recess formed in said housing for rotatably connecting said housing and said worm wheel to said shaft and an uncoupled position in which it is disengaged from said recess to disconnect said housing and worm wheel from said shaft, there being also provided a resilient member which acts on said anchoring member so as to urge it towards its coupled position.

6 Claims, 8 Drawing Figures

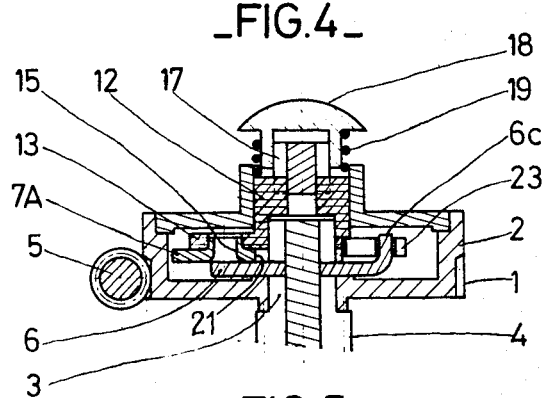
_FIG.4_
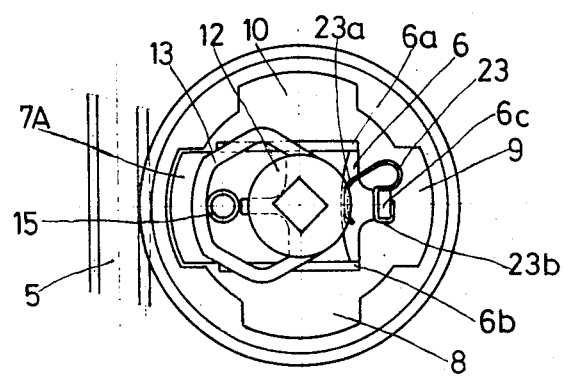
_FIG.5_
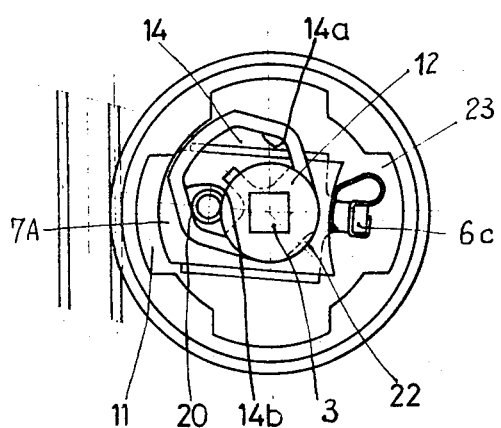
_FIG.6_

MEANS FOR OPERATING THE SIDE-WINDOWS IN AUTOMOBILE VEHICLES

This invention relates to a worm and worm wheel reduction mechanism for use in means for operating the side-windows of automobile vehicles, said means being of the type comprising a small electric motor and a pinion which engages a toothed part connected to a lever for moving the window, the reduction mechanism being used to transmit the torque of the electric motor to the pinion.

In known constructions, the worm of the reduction mechanism is coupled to the shaft of the electric motor and the worm wheel which is associated with the worm is rigidly fixed to a shaft carrying the pinion. Consequently, if damage occurs to the electric motor or to its electrical supply system, it is no longer possible to operate the window which can thus remain stuck in an intermediate position of its travel.

It is known to overcome this disadvantage by fitting the mechanism with a manual emergency operating means which enables the pinion to be coupled with or disengaged from the shaft of the reduction mechanism in such a way that the side-windows can be moved both by the motor during normal working and manually in case of emergency due to the motor being damaged.

In certain known devices the transition from motorised operation to manual operation takes place through an axial sliding movement of the pinion which is engaged with said toothed part and this means that when the manual emergency operating means is put into operation, the coupling operation necessitates a force of a certain intensity which is dependent both on the friction which occurs when the teeth of the pinion engage the toothed part and on the resilient reaction of a return spring which is proportional to this friction.

In other devices the transition to emergency operation takes place through an intermediate part such as an annulus which is slidably mounted on the shaft carrying the pinion and which is rotated by said shaft, said annulus being equipped with teeth which are anchored in corresponding recesses made in one of the front faces of the worm wheel.

Even though in these devices just described, the force required to disengage the pinion from the worm wheel has been reduced by a considerable amount, it is still too great for convenient manual operation.

The object of the present invention is to overcome these disadvantages.

In accordance with the invention there is provided for use in means for operating the side-windows in automobile vehicles, said means comprising an electric motor and a pinion which in use engages a toothed part connected to a lever for moving the window, a worm and worm wheel reduction mechanism for transmitting the torque of said electric motor to said pinion wherein said mechanism includes a guide member which is rotatable with a shaft of the reduction mechanism, means for coupling said worm wheel to said guide member constituted by an anchoring member which engages when in a coupled position in a correspondingly shaped recess formed in a housing connected to the worm wheel, means for sliding said anchoring member radially on said guide member rotatable with said shaft for disengaging the anchoring member from the housing and a resilient member which exerts a force tending to maintain the anchoring member in its coupled position.

Said means for sliding said anchoring member may comprise an operating member, freely mounted on said shaft of the reduction mechanism and having an attachment in which is formed a V-shaped hole which receives a lug forming part of said anchoring member, the shape of said hole being such that when the operating member is rotated in one direction or the other, it communicates to said anchoring member a radial movement relative to said guide member so as to ensure that said anchoring member is coupled or uncoupled in relation to the housing.

The resilient member may be substantially in the form of a hair-pin in which the loop-shaped middle part is attached to a curved tab of the guide member, while its prongs abut on the lateral sides of the operating member in such a way that they always tend to bring the anchoring member back to its initial coupled position.

There may also be provided a push button which is resiliently urged towards a rest position and which can be pressed into engagement with the operating member so as by friction to cause said member to become locked and to bring about an uncoupling of the anchoring member from the housing as long as pressure is exerted on the push button.

Alternatively, the resilient member may be constituted by a leaf spring, one of the ends of which is secured to a curved tab of the guide member, the other end, which is free, being shaped in such a way that it exerts pressure on the anchoring member to oppose inward radial movement thereof, said leaf spring being shaped to fit into a recess formed in the operating member so as to hold said operating member in a position corresponding to the coupled position of the anchoring member.

As a further alternative, the resilient member may be formed by moulding plastics material and have a hole in which a curved tab of the guide member engages and a wall which can be deformed resiliently so as to exert pressure on the anchoring member against inward radial movement thereof, the middle part of said wall having a projection which fits into a recess formed in the operating member to hold said operating member in a position corresponding to the coupled position of the anchoring member.

Figure 2:
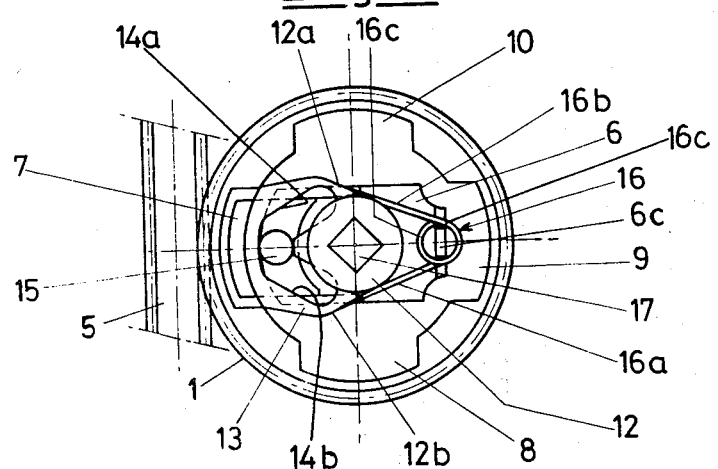
Figure 3:
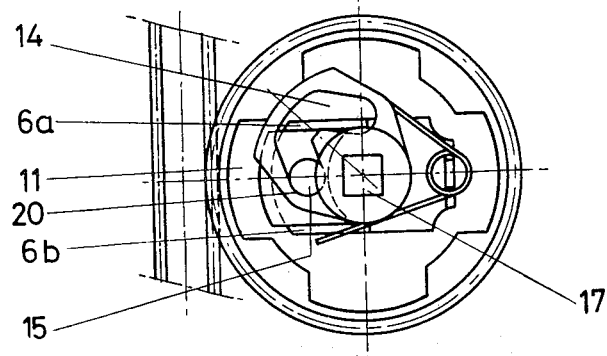
Figure 7:
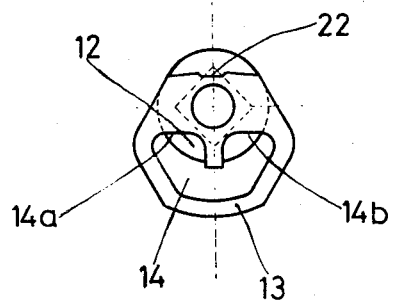
Figure 8:
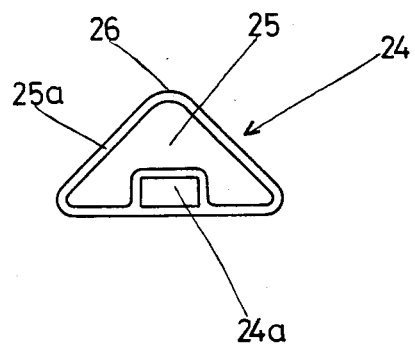

The invention will now be more particularly described with reference to the accompanying drawings wherein:

FIG. 1 is a view in axial section of one example of a reduction mechanism in accordance with the invention, the mechanism being shown in a condition in which rotation of the worm by an associated electric motor will result in operation of the mechanism, FIG. 2 is a plan view of the mechanism seen in FIG. 1 but with the push button and cover seen in FIG. 1 removed, FIG. 3 is a plan view similar to FIG. 2 but with the mechanism in a condition in which it is set for emergency manual operation, the drive through the worm having been disconnected, FIGS. 4, 5 and 6 are views which correspond respectively to FIGS. 1, 2 and 3 but which show an alternative embodiment of reduction mechanism in accordance with the invention, FIG. 7 is a view from below of the operating member and attachment which is seen in FIGS. 1, 2 and 3, and FIG. 8 is a plan view, on an enlarged scale, of an alternative form of resilient member which may be used in a reduction mechanism in accordance with the invention.

Referring firstly to FIGS. 1–3, the reduction mechanism shown therein comprises a worm wheel 1, formed on the periphery of a housing 2 which is conveniently made of plastics material, the shaft 3 of the reduction mechanism passing through the centre of said housing. One end of said shaft is designed to receive a pinion 4 which in use engages a toothed part (not shown) of a lever system for operating a side window of an automobile. A worm 5 engages the worm wheel 1. A guide member 6 is disposed in the bottom of the housing 2 and is so coupled to said shaft 3 that when the member 6 rotates, the shaft 3 will rotate also. This guide member is designed in such a way as to present a slide, which is obtained by bending up at right angles its two lateral edges 6a and 6b, and in this slide an anchoring member 7 slides. This member 7 is constituted by a small plate which is arranged so that its outer end can fit into one of the recesses 8, 9, 10 or 11 of corresponding shape which are formed radially inside the housing 2, as will be later explained.

This small plate 7 can be moved on said guide 6 by an operating member 12 which is mounted freely on the end of the shaft 3 of the reduction mechanism and is conveniently made of plastics material. The operating member 12 has an attachment 13 secured to its base which is shaped symmetrically in relation to an axis of symmetry perpendicular to the axis of the shaft 3, and in said attachment is a V-shaped hole 14 in which a lug 15 slides which forms an integral part of the anchoring member 7. This hole 14 which is V-shaped enables a radial movement to be imparted to the anchoring member 7 when relative rotation takes place between the operating member 12 and the shaft 3. Thus the operating member 12 can be turned manually when shaft 3 is stationary and depending on whether the rotation takes place in one direction or the other, the lug 15 will follow one or other of the inclined faces 14a or 14b of the V-shaped hole 14 until it reaches an end position 20 (FIG. 3). This will displace the anchoring member 7 radially inwardly until its outer end moves out of the recess 11. The drive previously possible through worm 5, worm wheel 1, member 7, member 6 and shaft 3 is now disengaged since rotation of the worm wheel 1 and housing 2 will no longer rotate member 7. The shaft 3 can now be turned manually. When this manual rotation ceases and the mechanism is again driven by the motor through worm 5, the anchoring member 7 will become anchored to the housing 2 once more, automatically, as soon as it reaches one of the recesses 8, 9, 10 or 11 located in the housing 2, having been moved radially outwardly again through the action of a resilient member 16 now described.

Said resilient member 16 is constituted by a part shaped like a hair-pin of which the central portion which is loop-shaped, 16c, is fastened to a curved tab 6c of the guide member 6 whilst its prongs 16a and 16b abut on the lateral sides 12a and 12b of the operating member 12 and attachement 13 in such a way that they tend always to bring the anchoring member 7 back into its initial engaged position as seen in FIG. 2, this being because of the action of the aforesaid inclined faces 14a or 14b on the lug 15. In fact, since the prongs 16a and 16b of the resilient member 16 are of the same shape they always exert a pressure tending to realign the assembly. When the anchoring member is in an engaged position as seen in FIG. 2 the lug 15 is located in the centre of the aperture 14 thus preventing said member from moving radially in the guide member 6.

The end of the operating member 12 is provided with drive means which can be in the form of a square 17 which is designed to receive the end of a crank thus enabling the mechanism to be operated by hand. Thus, turning of the member 12 will initially act to move the mechanism from the condition seen in FIG. 2 to the disengaged condition seen in FIG. 3. In the latter condition the lug 15 is in an end position 20 and further turning of the member 12 by the crank in the same direction will rotate the shaft 3 manually via member 12, attachment 13, member 7, member 6 and shaft 3, the housing 2 meanwhile remaining stationary.

The device can also be equipped with a safety system which enables upwards or downwards movement of the window to be stopped immediately in an emergency when the device is being driven by the electric motor.

This safety system can be constituted by a push button 18, freely mounted on the square 17 disposed on the end of the operating member 12. During normal functioning, in order to prevent any contact between the push button 18 and the operating member 12, a resilient member 19 constituted by a spring, is disposed between these two members in order to hold the push button in a rest position as shown in FIG. 1.

When pressure is exerted by the person operating the mechanism on the push button 18, said button is brought into contact with the operating member 12 and arrests it through friction, the result of this being a disengagement of the device in accordance with the same principle described above, the only difference being that the operating member 12 is now held stationary whilst the housing 2 continues to turn for a short while until disengagement of member 7 from a recess 8, 9, 10 or 11 of the housing 2 occurs.

In an alternative embodiment seen in FIGS. 4–6, the end of the shaft 3 traverses a longitudinal hole 21 formed in the anchoring member 7A so as to enable said member to slide in the guide member 6.

The rear part of the attachment 13 is formed with a positioning slot 22 located on the axis of symmetry of the attachment 13 and having a shape corresponding to that of the free end 23a of a resilient member 23. The V-shaped hole 14 acts on the anchoring member 7A through lug 15 as before when the operating member 12 is turned by hand. In fact, whether rotation takes place in one direction or another, the lug 15 will follow one or other of the ramp faces 14a or 14b of the V-shaped hole 14 until it reaches an end position 20 (FIG. 6). The anchoring member 7A will then be disengaged from its housing, recess for instance the recess 11 and the system is disengaged, thus permitting manual operation.

When this manual operating ceases and the mechanism is once again driven by the motor, the anchoring member 7A will automatically become anchored again as soon as it reaches one of the recesses 8, 9, 10 or 11 formed in the housing 2, due to the action of the resilient member 23, as previously explained.

The resilient member 23 is constituted by a leaf spring, one end of which 23b is fixed on a curved tab 6c of the guide member 6, the other, free, end 23a being curved inwards so that it exerts pressure on the anchoring member 7A against inward radial displacement thereof relative to the shaft 3 and so that it is able to fit in the positioning recess 22 made in the rear part of the attachment 13 of the operating member 12 in such a way as to hold said member in its rest position corresponding to the engaged position of the anchoring member 7A (FIG. 5).

Another embodiment differs from the above described embodiment more particularly in that it employs a resilient member 24 (FIG. 8), which is formed by moulding plastics material, having a hole 24a in which the curved tab 6a of the guide member 6 engages in such a way as to be held there, and a hole 25 which defines a wall 25a which is resiliently deformable so as to exert a pressure on the anchoring member 7A against its inward radial displacement, and on the middle part of said wall a projection 26 extends which is able to fit into the positioning recess 22 in the operating member 12.

Another possible embodiment (not shown) uses a resilient member which is formed integrally with the anchoring member 7A or with the guide member 6 by moulding plastics material.

I claim:

1. For use in means for operating the side-windows in automobile vehicles, said means comprising an electric motor and a pinion which in use engages a toothed part connected to a lever for moving the window, a worm and worm wheel reduction mechanism for transmitting the torque of said electric motor to said pinion wherein said mechanism includes a guide member which is rotatable with a shaft of the reduction mechanism, means for coupling said worm wheel to said guide member constituted by an anchoring member which engages when in a coupled position in a correspondingly shaped recess formed in a housing connected to the worm wheel, means for sliding said anchoring member radially on said guide member rotatable with said shaft for disengaging the anchoring member from the housing and a resilient member which exerts a force tending to maintain the anchoring member in its coupled position.

2. A worm and worm wheel reduction mechanism as claimed in claim 1, wherein said means for sliding said anchoring member comprise an operating member, freely mounted on said shaft of the reduction mechanism and having an attachment in which is formed a V-shaped hole which receives a lug forming part of said anchoring member, the shape of said hole being such that when the operating member is rotated in one direction or the other, it communicates to said anchoring member a radial movement relative to said guide member so as to ensure that said anchoring member is coupled or uncoupled in relation to the housing.

3. A worm and worm wheel reduction mechanism as claimed in claim 2 wherein the resilient member is constituted by a part which is shaped like a hair-pin, the middle part of which is loop-shaped and is attached to a curved tab of the guide member, while its prongs abut on the lateral sides of the operating member in such a way that they tend always to bring the anchoring member back to its initial coupled position.

4. A worm and worm wheel reduction mechanism as claimed in claim 2, wherein said means for sliding said anchoring member also includes a push button which is resiliently urged towards a rest position and which can be pressed into engagement with the operating member so as by friction to cause said member to become locked and to bring about an uncoupling of the anchoring member from the housing as long as pressure is exerted on the push button.

5. A worm and worm wheel reduction mechanism as claimed in claim 2, wherein the resilient member is constituted by a leaf spring, one of the end of which is secured to a curved tab of the guide member, the other end, which is free, being shaped in such a way that it exerts pressure on the anchoring member to oppose inward radial movement thereof relative to the shaft of the reduction mechanism, said leaf spring being shaped to fit into a recess formed in the operating member so as to hold said operating member in a position corresponding to the coupled position of the anchoring member.

6. A worm and worm wheel reduction mechanism as claimed in claim 2, wherein the resilient member is formed by moulding plastics material and has a hole in which a curved tab of the guide member engages and a wall which can be deformed resiliently so as to exert a pressure on the anchoring member against inward radial displacement thereof relative to the shaft of the reduction mechanism, the middle part of said wall having a projection which fits into a recess formed in the operating member to hold said operating member in a position corresponding to the coupled position of the anchoring member.

* * * * *